Oct. 6, 1931.  W. H. CHARCH ET AL  1,826,698
METHOD OF COATING
Original Filed Oct. 12, 1928  3 Sheets-Sheet 1

Fig.1.

Oct. 6, 1931.         W. H. CHARCH ET AL         1,826,698
                       METHOD OF COATING
           Original Filed Oct. 12, 1928    3 Sheets-Sheet 2

INVENTORS
BY
ATTORNEY

Oct. 6, 1931.  W. H. CHARCH ET AL  1,826,698
METHOD OF COATING
Original Filed Oct. 12, 1928   3 Sheets-Sheet 3

William H. Charch
Norman A. Craigue
INVENTORS
BY Wm. S. Pritchard
ATTORNEY

Patented Oct. 6, 1931

1,826,698

UNITED STATES PATENT OFFICE

WILLIAM H. CHARCH, OF BUFFALO, AND NORMAN A. CRAIGUE, OF KENMORE, NEW YORK, ASSIGNORS TO DU PONT CELLOPHANE COMPANY, INC., OF NEW YORK, N. Y., A CORPORATION OF DELAWARE

METHOD OF COATING

Original application filed October 12, 1928, Serial No. 312,041, and in Germany October 7, 1929. Divided and this application filed June 18, 1930. Serial No. 461,892.

This invention relates to coating and more particularly to a method for coating films, webs or sheets of regenerated cellulose sold under the trade name "Cellophane" with a moistureproofing composition preferably comprising a cellulose derivative, a wax, preferably paraffin wax, a gum or resin, a plasticizer and a solvent or solvent mixture, and is a division of application Serial No. 312,041, filed October 12, 1928.

"Cellophane" produced in the usual casting machine has a bead on each edge which is two to four times thicker than the center parts of the film. In the usual methods of coating other materials, it was impossible to coat a "cellophane" film, sheet or web without having a large excess of coating material on the edges of the film and a zone about six to eight inches in width adjacent said edges. In order to obtain a uniformly coated "cellophane" film, web or sheet by these processes it was necessary to cut away or trim the bead prior to coating.

We have found that we can eliminate and overcome this disadvantage and secure a substantially uniform coated surface by wiping or removing the excess coating material at the marginal zones adjacent the beads prior to removing the excess coating material from the entire width of the "cellophane" film, web or sheet.

We have found that by raising the temperature of the coating composition on the base as rapidly as possible to approximately the same or higher than the melting point of the wax in the composition and maintaining the applied coating composition in a homogeneous state until all the solvent is eliminated, accidental "blushing" can be prevented.

When "cellophane" is heated, it has a tendency to lose some of its moisture and become somewhat brittle. This also occurs when "cellophane" is coated with a moistureproofing composition as herein used and subsequently dried by evaporating the solvent or solvent mixture in a heated atmosphere.

We have found that we can overcome this defect by subjecting the "cellophane" film, web or sheet to a humidifying action prior to and/or after the coating operation. If the coated material is subjected to a humidifying action the last trace of the solvent will also be eliminated and the coated film substantially deodorized.

It is therefore an object of this invention to provide a method of moistureproofing "cellophane" films, webs or sheets with a moistureproofing coating composition preferably comprising a cellulose derivative, a wax, such as paraffin, a gum or resin, a plasticizer and a solvent or solvent mixture to produce a substantially transparent, odorless, flexible, non-tacky material.

Another object of this invention is to provide a method wherein the wax ingredient is prevented from precipitating out and producing a "blush".

Another object of this invention is to provide a method for providing a substantially uniform coated surface on "cellophane" having beaded edges without removing said beaded edges.

A still further object of this invention is to provide a method wherein the flexibility of the coated article, which may have been lost during the process, is restored.

Further objects will appear from the following description, appended claims and accompanying drawings illustrating one form of apparatus capable of carrying out the method and in which:

In carrying out our invention the "cellophane" in the form of a continuous film, web or sheet, after being subjected to a humidifying atmosphere, is passed through a bath containing the coating composition, thence between doctor blades, and finally through a drying chamber. After the exit of the coated film from the drying chamber, it is subjected to a deodorizing or humidifying atmosphere, preferably at a temperature above room temperature, whereby the flexibility of the coated film is increased and the last traces of solvents eliminated, thus rendering the coated film odorless.

Figure 1:
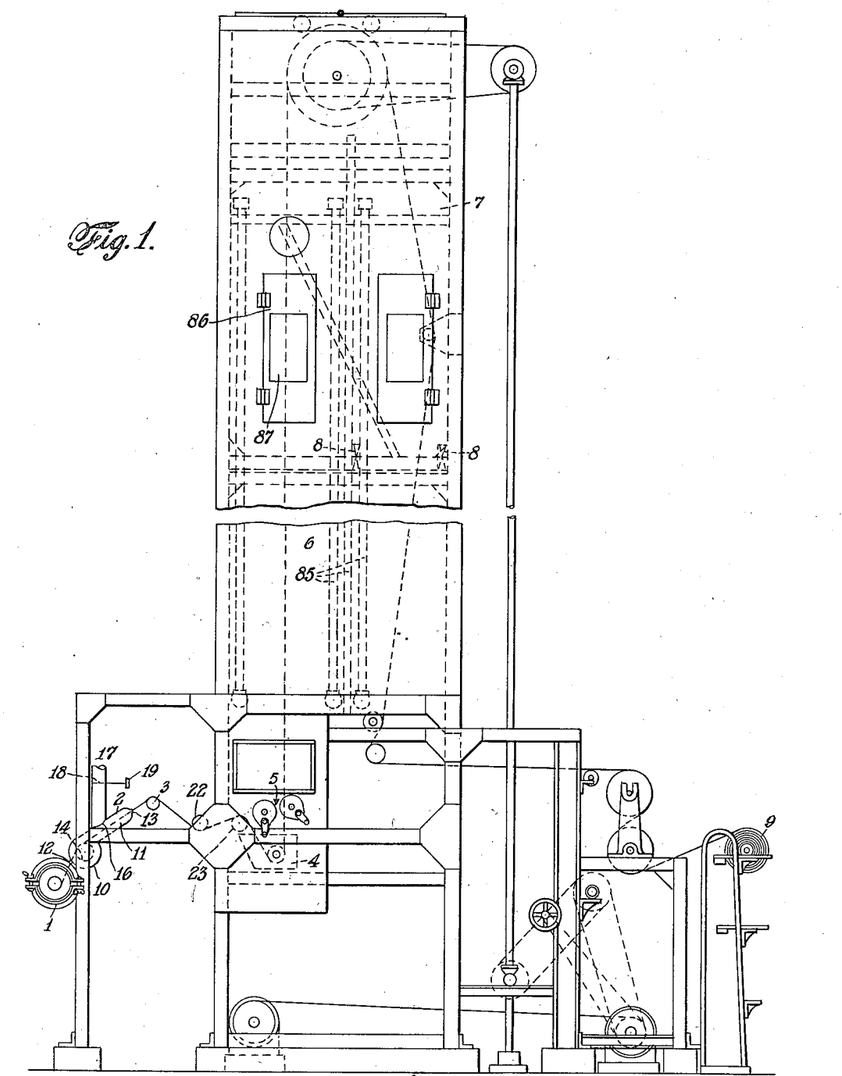
Figure 1 is a front elevation of the apparatus for carrying out this invention.

Referring now to the drawings and especially to Figure 1, where there is disclosed one modification of a complete apparatus for carrying out this invention mounted on a suitable framework, the web or film of "cellophane" as it is withdrawn from a roll 1 is passed through a humidifying box 2, thence across various spreader rolls 3 and into the coating bath 4. From the coating bath 4 the film is drawn up between a wiping mechanism 5 whereby the excess coating material is removed and thence immediately into a drying or evaporating chamber 6. After traveling through the drying chamber, the substantially dried coated film is drawn through a humidifying chamber 7 in which there are disposed deodorizers 8. Upon the exit of the treated film from the humidifier 7, it passes through the air and it is wound up on a roll 9.

The roll 1 consists of a continuous film or web of "cellophane" as it is produced in the usual casting machine. In other words the film or web of "cellophane" has the usual beaded edges.

From the source of supply the "cellophane" passes through a humidifier. Various means may be used to humidify the "cellophane". The description of the following humidifier is merely illustrative and not limitative of the invention.

Figure 7:
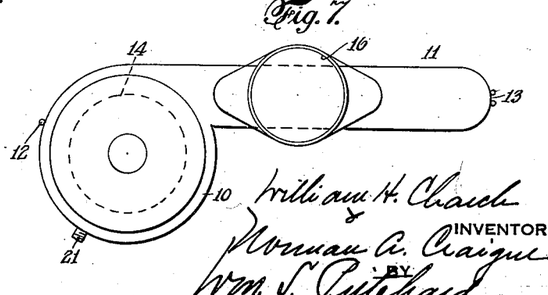
Figure 7 is a detail of the humidifying box.

The humidifying box 2 is made of metal and is mounted on the framework in any suitable position between the supply roll 1 and the coating mechanism 4. It comprises a cylindrical portion 10 provided with an extension 11. In the cylindrical portion 10 there is a slot 12 providing an entrance through which the "cellophane" passes into the interior of the humidifying box. The edges of the slot are preferably rounded to form beads whereby smooth edges are presented to the "cellophane", and damage to the latter is eliminated. The extension 11 is also formed with a slot 13 having beaded or turned edges as described, whereby the humidified "cellophane" passes from the humidifier. Mounted on the cylindrical portion 10 of the humidifier is a roll 14 which, together with roll 3, provides means for guiding the "cellophane" through the humidifier.

Connected to or cooperating with openings 16 in the sides of the extension 11 of the box are two ducts 17 which supply the humidifying atmosphere from any suitable source. The ducts may be made to terminate at the openings or they may extend into the interior of the box. If the latter structure is used, the portions of the ducts extending within the box have their ends closed and provided with a slot or perforation through which the humidifying atmosphere may be introduced into the box. The amount of humidifying atmosphere introduced is maintained by a damper 18 placed in the duct and controlled by a handle 19. The top of the humidifying box is provided with movable or slidable covers or lids (not shown) whereby access to the interior of the humidifying box may be readily had. In the bottom of the cylindrical portion 10 of the humidifier are drip connections or valves 21 whereby the drippings produced during the operations may be removed. The passage of the film through the humidifier is of relatively short duration and its moisture content is somewhat increased. The increase in moisture serves to minimize to a certain degree the drying out of the film as it passes up through the drying chamber. This step alone is usually not sufficient to prevent an undesirable drying out of the film but in combination with the final humidifying step described below it has been found to be effective. This humidifying step also tends to eliminate wrinkles from the film and prevents a lapping over of the film as it passes through the doctor blades with consequent breakage which would ensue.

From the humidifier the film is passed beneath and under various spreading rolls 22 and 23 mounted on the frame and thence into the coating bath 4. If desired, prior to the passage of the humidified film into the bath, the film may be passed through a slot 24 adjacent which is a wiper 25, which removes any drippings or globules of condensed moisture.

Submerged in the coating bath 4 contained in any suitable receptacle 26 is a roller 27 which is adapted to be raised to allow the threading of the "cellophane" through the machine. A jacket 28 surrounds the receptacle whereby the coating composition may be heated or cooled by the circulation of steam, cold air or water as desired. To obtain optimum results the temperature of the coating composition should be maintained between approximately 20° C. and 40° C. Above 40° C. an appreciable amount of solvent evaporates, causing an undesirable atmosphere. However, a slightly elevated temperature of the bath is preferable, because it prevents any tendency of the wax to separate out from the coating solution. Again, it results in a slight preheating of the film, thereby lessening the burden of the drier during the initial stage of the evaporation.

The coated film as it emerges from the coating bath passes through the wiping mechanism 5 whereby the excess coating material is removed.

Figures 2, 5, 6:
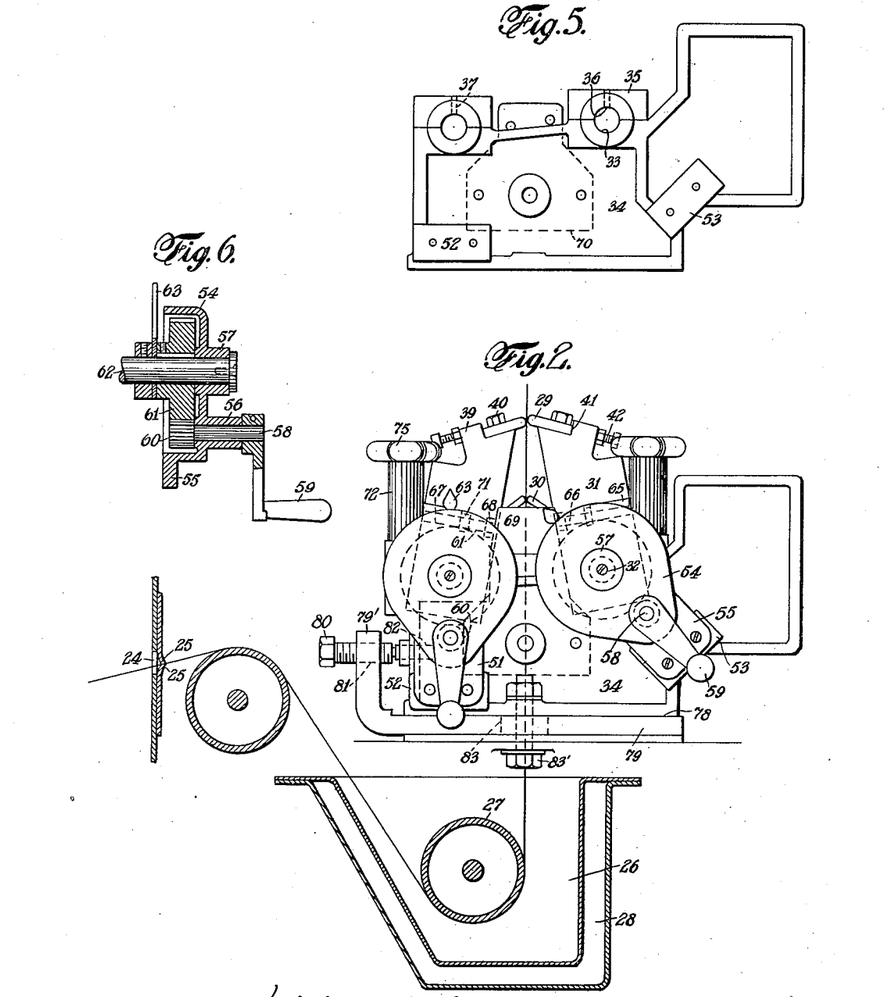
Figure 2 illustrates the arrangement of the doctor blade mechanism and accompanying parts.
Figure 5 illustrates the casting on which the blade holder trunnions and clamps are mounted.
Figure 6 is a detail of the mechanism for moving the doctor blades apart, permitting the machine to be threaded with the "cellophane" film, web or sheet.

The wiping mechanism 5 comprises means for wiping both sides of the "cellophane" sheet, film or web passing therebetween. Since the wiping elements for wiping the two sides are duplicates, only one will be described.

Figure 3:
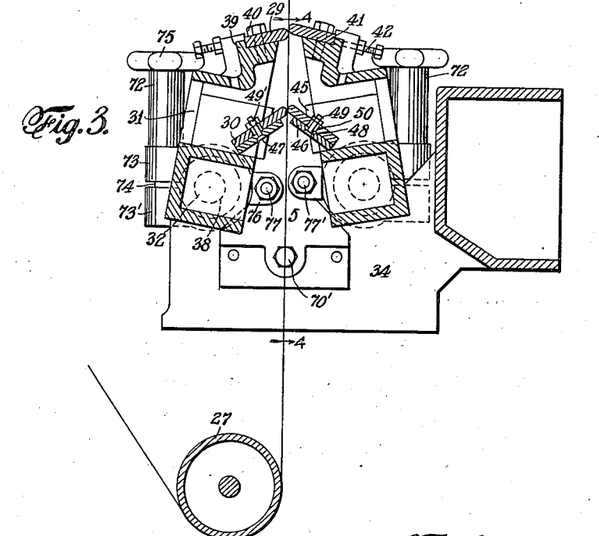
Figure 3 is a vertical section through Figure 2.

The wiping mechanism 5 comprises doctor blades 29 and auxiliary doctor blades 30 mounted on blade carriers 31 carried on trunnions 32. The trunnions 32 are carried in bearings formed by semi-cylindrical bores 33 formed in castings 34 and caps 35 having bores 36 complemental to bores 33, secured to castings 34 by any suitable means. If desired, the caps 35 may be provided with oil holes 37 whereby the trunnions may be lubricated.

The blade carriers 31 in their lower portions have bores 38 therethrough, whereby the carriers 31 are mounted on the trunnions 32. The upper extremities of the carriers 31 are formed to provide supports 39 for the main doctor blades 29 which are secured thereto by bolts 40. The rear edges of the doctor blades 29 engage shoulders 41 through which screws 42, spaced at suitable intervals in the shoulders 41, pass. The ends of screws 42 are adapted to engage the rear faces of the doctor blades 29, whereby adjustment of the screws will adjust the doctor blades.

Figure 4:
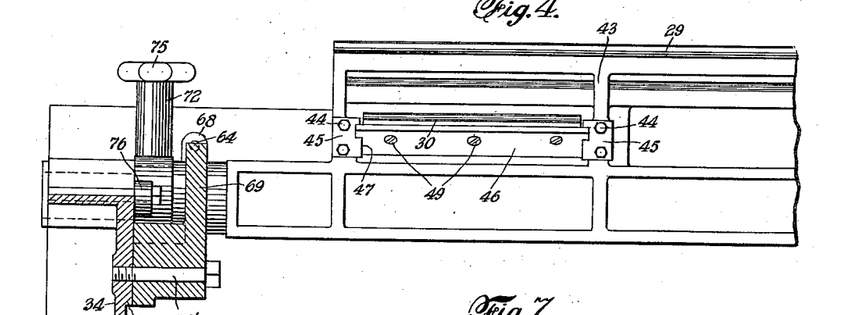
Figure 4 is a vertical section taken on line 4—4 of Figure 3 illustrating the arrangement of the doctor blades.

Situated beneath the main doctor blades 29 are the auxiliary or short doctor blades 30 mounted as immediately hereafter described. Secured to ribs 43 of the blade carriers 31, and adjacent each end thereof by means of bolts 44, are two spaced-apart elements 45. A plate 46 having a slot or hole 47 extending at an angle, i. e. 45° to said plate, is mounted on elements 45 forming an inclined carrier 46 for the auxiliary blades 30. The carrier 46 is provided with a plurality of holes 48 through which screws 49 are adapted to pass. The auxiliary blades 30 are provided with slots 50 through which the screws 49 pass and which permit sufficient movement of the blades for accurate adjustment. By means of the nuts 49' engaging the ends of the screws 49, the auxiliary blades 30 are locked in position.

The main doctor blades 29, mounted as above described, extend across the width of the machine and constitute means for wiping the entire width of the "cellophane" sheet, film or web on both sides. It is essential that the wiping edge of the doctor blade 29 be even and kept in adjustment. To this end the edge of the blades is maintained and/or attained by the movement of the screws 42 above-described. In wiping both sides of a "cellophane" film, web or sheet, we have found that if the main blades 29 are arranged at an angle to the passing film and in a staggered position, we obtain highly satisfactory results. The staggering of the blades, as illustrated in Figure 3, permits the blades to overlap and, since the blades are adjustable, the amount of overlapping is adjustable. This overlapping gives a good scraping action and permits the blades to be spaced wider apart than in the usual arrangement. The wider spacing of the doctor blades is especially important since "cellophane" film varies in thickness. If the blades were spaced too close to each other, a thick portion of the film passing between the blades would be damaged or torn.

The auxiliary doctor blades 30 (a pair disposed at each end of the machine) adjustably mounted as above described, are adapted to engage the zones adjacent the longitudinal edges of the "cellophane" film. Accordingly, the doctor blades 30 are made of such length as to only wipe the desired area of the "cellophane" film, web or sheet. Various lengths may be used. We have found that if the auxiliary blades 30 are twelve inches in length when a film forty inches wide is treated, satisfactory results are obtained. The blades 30 may be staggered and overlapped similar to the main blades 29, or the edges may be positioned in the same plane.

The auxiliary doctor blades 30 may be made of various materials. We have obtained satisfactory results when they were made of flexible materials, such as spring brass with beaded edge, leather, thin steel and the like.

To thread the machine, it is necessary that the blades 29 and 30 be opened up or spread apart. For this purpose an externally geared handle mechanism 51 is provided. The handle mechanism 51 is mounted on pads 52 and 53 of the casting 34 and, since both mechanisms are similar, only one will be described. A gear casing 54 is provided with an extension 55 by means of which the casing is secured to the pad. The casing 54 is also provided with bearings or journals 56 and 57. In the journal 56 a stub shaft 58 is positioned. On one end thereof a handle mechanism 59 is fastened by any suitable means. On the other end of the shaft 58 there is keyed a gear 60 which is adapted to mesh with a gear 61 carried on an extension 62 of the trunnion 32 and supported in the journal 57. It is obvious that rotation of the handle 59 will rotate the trunnion 32 whereby the blade holder will be moved and the blades separated. In order to indicate the amount of rotation, an indicator 63 or other means is fastened to the extension 62. The casing 54 may be graduated whereby the amount of rotation of the trunnion 32 may be instantly revealed by the indicator 63.

After the blades 29 and 30 have been adjusted and opened, and the machine threaded, the handle 59 is rotated, whereby the blades 29 and 30 are closed. To insure that the blades return to their original adjusted positions, adjustable stops 64 are mounted on bosses 65 of the blade holders. The stops comprise bolts 66 screwed in threaded holes 67 in the bosses 65. Nuts or bolt-heads 68 on the extremity of bolts 66 are adapted to engage a stop-block 69 mounted on the pad 70 of the casting 34 by means of a bolt 70' and positioning dowels. By means of a nut 71, or other suitable means, the stop 64 may be, after adjustment to any desired position, locked.

After the blades 29 and 30 have been brought back to their original adjusted position, means are provided to maintain the blades 29 and 30 in position during the operation of the machine. The means for attaining this result comprises hand clamp devices 72. Specifically, the hand clamp 72 comprises clamping members 73 and 73' adapted to engage the trunnion 32 and a screw 74 operated by rotation of the head 75, whereby the clamping elements 73, 73' are tightened or loosened. By means of ears 76 and bolts 77 and 77', respectively, the clamps are mounted on the end casting 34.

As above mentioned, the entire wiping mechanism 5 is slidably mounted whereby it may be adjusted to any desired position in relation to the coating bath. Various means may be used to attain this result. In the drawings, we have shown one for effecting this result. Extending through the lower portion of the casting 34, is a channel 78 in which a bar 79 is positioned. One end 79' of the bar 79 is bent upwardly and has a bolt 80 extending through a threaded hole 81 therein and through a threaded hole 82 in the casting 34. In its horizontal arm, the bar is formed with a slot 83 through which a bolt 83' connecting the casting 34 to the frame extends. Rotation of the bolt 80 moves the entire mechanism, the limits of said movement being governed by the length of slot 83. Suitable means may be mounted on the bolt 80 whereby rotation of the screw is prevented when not desired.

In the arrangement of the doctor blades, above described, it has been found that the tension on the film is of extreme importance and is one of the factors which regulates the quantity of the coating which is left on the film after passing through the blades. Low tensions result in considerably less friction on the film by the blades and consequently considerably more coating is left on the film than would result when higher tensions are employed. The thickness of the coating may be varied as much as 100% and over by just varying the tension on the film. For this reason, it is necessary to employ a device which will maintain the tension of the film through the doctor blades at some predetermined adjustable tension. Various means may be employed. We have found that by controlling the tension of the roll 1 from which the film is supplied, we can obtain a suitable tension through the doctor blades. We therefore apply to the spindle on which the roll is carried any suitable braking means applying a progressively increasing tension as the supply on the roll decreases. Since the specific details of the brake means form no part of this invention, further description thereof is deemed unnecessary.

From the wiping mechanism 5 the coated film is caused to pass into a drier 6 located in close proximity to the wiping mechanism, whereby the coated films approach the temperature of the drier as rapidly as possible and before any substantial evaporation of solvent. This is to minimize the amount of solvent evaporated at the lower temperature and to prevent "blushing". "Blushing", as above described, is the result of the separation of wax in very minute particles from the other solid ingredients of the coating composition, and is evidenced by the hazy, translucent or opaque films. Paraffin or other wax possesses a definite and limited solubility in the coating compositions which we use, said solubility depending primarily upon the temperature. At the temperature approximately that of the melting point of the wax in the composition or higher, its solubility is many times greater than it is at lower temperatures. Accordingly, we maintain the temperature of the drier at or above the melting point of the wax in the composition.

The drier 6 comprises a casing having heated coils 85 on both sides thereof. Disposed at various points in the drier are doors 86 hinged to the casing and provided with wire glass windows 87, whereby access to the interior of the drier may be easily had and, due to the wire glass windows 87, the interior of the drier may be at any time viewed. The temperature of the drier is preferably maintained in the vicinity or at the entrance of the film at 80° C. to 100° C., and the remainder of the drier is maintained at such a temperature that the paraffin or other wax will not be precipitated out. The upper sections of the drier are maintained at a temperature of not lower than 60° C. to 65° C.

From the drier, the coated film is introduced into a humidifier having means 8 disposed at various points therein whereby moisture may be introduced in the chamber and restore or impart flexibility to the coated film. Various means may be used to attain this result. We have found that steam introduced through pipes, the openings of which are covered with canvas, produces satisfactory results. We have also found that satisfactory results are obtained if the humidification is carried out at a temperature higher than room temperature and preferably above 40° C. and around 50° C. to 60° C.

To attain this result, the humidifying chamber is provided with heating coils. The humidifier is also provided with doors having windows similar to the drier 6. The drier 6 and the humidifier 7 may be formed separately and disposed adjacent each other. However, they may be formed from a single casing having a partition therein and separating the two zones, as illustrated in Figure 1.

In the humidifier 7 the flexibility and pliability of the coated film is restored. During the process when the film is subjected to a temperature greater than the critical temperature corresponding closely to the melting point of the wax, but slightly lower by 5° to 10° C., the moisture proof properties seem to disappear to a great extent. Also, during the process considerable moisture is lost by the film during its initial drying. In this final step the film picks up additional moisture so that its moisture content is brought back to that necessary for a flexible and pliable film. During this final step substantially all the solvent is eliminated and the film rendered odorless.

When the film finally issues from the warm humidifying chamber and into the air, it is cooled in any suitable manner as by permitting the film to cool itself or by employing any suitable means for cooling it, whereby its temperature drops and the moistureproof properties of the coating are restored. Upon cooling, the coating seals the base material and the moisture which the base has picked up.

From the humidifier the coated film passes through the air and is wound on a roll.

In the above method the material treated is described as a continuous film or web. The invention is not limited thereto since it is obvious that sheets of various sizes may be treated by the herein-described method.

In the claims the expression "a temperature approximately that of the melting point of said wax" is used. This expression is intended to cover the temperature as set forth in the description, viz., "a temperature approximately the same or higher than the melting point of the wax in the composition".

Throughout the description the term "wax" is employed. It is to be understood that this terminology is intended to cover one or more waxes employed alone or in combination with wax-like bodies.

In the claims the term "solvent" is intended to cover one or more solvents for cellulose derivatives used either alone or in combination with one or more diluents to form solvent mixtures.

Though the hereinbefore description relates specifically to the moistureproofing of "cellophane", it is obvious that it is not restricted thereto, since the essential features of this invention may be employed in coating numerous bases with various compositions.

Since it is obvious that various modifications may be made in the apparatus above-described, we do not intend to limit ourselves to the exact details above-described except as defined in the following claims.

We claim:

1. A method of coating which comprises subjecting a base to a humidifying treatment, applying a moistureproofing composition comprising a cellulose derivative, a wax and a solvent to said base, raising the temperature of said composition on said base as rapidly as possible to approximately the melting point of the wax, and evaporating the solvent at said temperature.

2. A method of coating which comprises subjecting a base to a humidifying treatment, applying a moistureproofing composition comprising a cellulose derivative, a wax and a solvent to said base, raising the temperature of said composition on said base as rapidly as possible to approximately the melting point of the wax, evaporating the solvent at said temperature, and subjecting the coated material to a humidifying treatment.

3. A method of coating which comprises subjecting a base to a humidifying treatment, applying a moistureproofing composition comprising a cellulose derivative, a wax and a solvent, and evaporating said solvent at a temperature approximately the melting point of the wax.

4. A method of coating which comprises subjecting a base to a humidifying treatment, applying a moistureproofing composition comprising a cellulose derivative, a wax and a solvent, evaporating said solvent at a temperature approximately the melting point of the wax, and subjecting the coated material to a humidifying treatment.

5. A method of preparing a moistureproof transparent material which comprises subjecting a sheet or film of regenerated cellulose to a humidifying treatment, applying a moistureproofing composition comprising a cellulose derivative, a wax and a solvent to said regenerated cellulose, raising the temperature of said composition on said sheet as rapidly as possible to approximately the melting point of the wax, and evaporating the solvent at said temperature.

6. A method of preparing a moistureproof transparent material which comprises subjecting a sheet or film of regenerated cellulose to a humidifying treatment, applying a moistureproofing composition comprising a cellulose derivative, a wax and a solvent to said regenerated cellulose, raising the temperature of said composition on said sheet as rapidly as possible to approximately the melting point of the wax, evaporating the solvent at said temperature, and subjecting the coated regenerated cellulose to a humidifying treatment.

7. A method of preparing a moistureproof transparent material which comprises subjecting a sheet or film of regenerated cellulose to a humidifying treatment, applying thereto a moistureproofing composition comprising a cellulose derivative, a wax and a solvent, and evaporating said solvent at a temperature approximately that of the melting point of said wax.

8. A method of preparing a moistureproof transparent material which comprises subjecting a sheet or film of regenerated cellulose to a humidifying treatment, applying thereto a moistureproofing composition comprising a cellulose derivative, a wax and a solvent, evaporating said solvent at a temperature approximately that of the melting point of said wax, and subjecting said coated regenerated cellulose to a humidifying treatment.

9. A method of preparing a moistureproof transparent material a sheet or film of regenerated cellulose, which comprises subjecting said regenerated cellulose to a humidifying treatment, applying a moistureproofing composition comprising a cellulose derivative, a wax and a solvent, evaporating said solvent at a temperature approximately that of the melting point of said wax, and subjecting said coated regenerated cellulose to a humidifying treatment, whereby said coated regenerated cellulose is deodorized.

10. A method of preparing a moistureproof transparent material a sheet or film of regenerated cellulose which comprises subjecting said regenerated cellulose to a humidifying treatment, applying a moistureproofing composition comprising a cellulose derivative, a wax and a solvent, evaporating said solvent at a temperature approximately that of the melting point of said wax, subjecting said coated regenerated cellulose to a humidifying treatment, and cooling said coated regenerated cellulose.

11. A method of preparing a moistureproof transparent material having a substantially uniform coated surface which comprises applying a moistureproofing composition to a sheet or film of regenerated cellulose having beads on its longitudinal edges, wiping the zones adjacent the beads of said sheet or film to remove a portion of the excess of said composition, and then wiping the entire surface of said sheet or film to remove the excess of said composition.

12. A method of preparing a moistureproof transparent material having a substantially uniform coated surface which comprises applying a moistureproofing composition to a sheet or film of regenerated cellulose having beads on its longitudinal edges, wiping the zones adjacent the beads of said sheet or film to remove a portion of the excess of said composition, wiping the entire surface of said sheet or film to remove the excess of said composition, and maintaining said sheet or film at a substantially uniform tension at least during the second wiping operation.

13. A method of preparing a moistureproof transparent material having a substantially uniform coated surface which comprises unwinding from a roll a sheet or film of regenerated cellulose having beads on its longitudinal edges, maintaining said roll under a varying tension, applying a moistureproofing composition, removing the excess of said moisture-proofing composition first at the zones adjacent the beads and then from the entire width of said sheet or film.

14. A method of preparing a moistureproof transparent material having a substantially uniform coated surface which comprises applying a moistureproofing composition to a sheet or film of regenerated cellulose having beads on its longitudinal edges, wiping the zones adjacent the beads to remove a portion of the excess of said composition, wiping the entire width to remove the excess of said composition, and drying said treated sheet or film.

15. A method of preparing a moistureproof transparent material having a substantially uniform coated surface which comprises applying a moistureproofing composition to a sheet or film of regenerated cellulose having beads on its longitudinal edges, wiping the zones adjacent the beads to remove a portion of the excess of said composition, wiping the entire width to remove the excess of said composition, drying and subjecting said coated sheet or film to a humidifying treatment.

16. A method of preparing a moistureproof transparent material having a substantially uniform coated surface which comprises applying a moistureproofing composition including a volatile solvent to a sheet or film of regenerated cellulose having beads on its longitudinal edges, removing the excess of said composition first at the zones adjacent the beads and then from the entire width of the sheet or film being treated, evaporating the solvent, and humidifying said coated regenerated cellulose.

17. A method of preparing a moistureproof transparent material having a substantially uniform coated surface which comprises applying to a sheet or film of regenerated cellulose having beads on its longitudinal edges a moistureproofing composition including a volatile solvent, removing the excess of said composition first from the zones adjacent the beads thereof and then from the entire width of the sheet or film being treated, evaporating said solvent, and deodorizing said coated regenerated cellulose.

18. A method of preparing a moistureproof transparent material having a substantially uniform coated surface which comprises applying to a sheet or film of regenerated cellulose having beads on its longitudinal edges a moistureproofing composition including a volatile solvent, removing the excess of said composition first from the zones adjacent the beads thereof and then from the entire width of the sheet or film being treated, evaporating said solvent, and deodorizing said coated regenerated cellulose, said sheet or film being maintained at a substantially uniform tension at least during the second wiping operation.

19. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess of said composition first from the zones adjacent the beads thereof and then from the entire width of the sheet or film, and evaporating said solvent at a temperature approximately the same as the melting point of said wax.

20. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess of said composition first from the zones adjacent the beads thereof and then from the entire width of said sheet or film, evaporating said solvent at a temperature approximately the same as the melting point of said wax, and subjecting said coated regenerated cellulose to a humidifying treatment.

21. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess composition first from the zones adjacent the beads thereof and then from the entire width of said sheet or film, evaporating said solvent at a temperature approximately the same as the melting point of said wax, and deodorizing said coated regenerated cellulose.

22. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess of said composition first from the zones adjacent the beads thereof and then from the entire width of said sheet or film, and evaporating said solvent at a temperature approximately the same as the melting point of the wax, said regenerated cellulose being maintained at a substantially uniform tension at least during the second wiping operation.

23. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess of said composition first from the zones adjacent the beads thereof and then from the entire width of said sheet or film, evaporating said solvent at a temperature approximately the same as the melting point of the wax, and subjecting said coated regenerated cellulose to a humidifying treatment, said regenerated cellulose being maintained at a substantially uniform tension at least during the second wiping operation.

24. A method of preparing a moistureproof transparent material having a substantially uniform coated surface which comprises applying to a sheet or film of regenerated cellulose having beads on its longitudinal edges a moistureproofing composition including a volatile solvent and a wax, removing the excess of said composition first from the zones adjacent the beads thereof and then from the entire width of said sheet or film, evaporating said solvent at a temperature approximately the same as the melting point of the wax, and deodorizing said coated regenerated cellulose, said regenerated cellulose being maintained at a substantially uniform tension at least during the second wiping operation.

25. A method of preparing a moistureproof transparent material having a substantially uniform coated surface which comprises subjecting a sheet or film of regenerated cellulose having beads on its longitudinal edges to a humidifying atmosphere, applying a moisture proofing composition thereto, wiping the zones adjacent the beads to remove a portion of the excess of said composition, wiping the entire width to remove the excess of said composition, and drying said treated sheet or film.

26. A method of preparing a moistureproof transparent material having a substantially uniform coated surface which comprises subjecting a sheet or film of regenerated cellulose having beads on its longitudinal edges to a humidifying atmosphere, applying a moistureproofing composition thereto, wiping the zones adjacent the beads to remove a portion of the excess of said composition, wiping the entire surface to remove the excess of said composition, drying, and subjecting said coated sheet or film to a humidifying treatment.

27. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent, removing the excess of said composition first at the zones adjacent the beads and then from the entire width of the sheet or film being treated, evaporating the solvent, and humidifying said coated regenerated cellulose.

28. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent, removing the excess of said composition first from the zones adjacent the beads and then from the entire width of the sheet or film being treated, evaporating the solvent, and deodorizing the coated regenerated cellulose.

29. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent, removing the excess of said composition first from the zones adjacent the beads and then from the entire width of the sheet or film being treated, evaporating the solvent, and deodorizing said coated regenerated cellulose, said sheet or film being maintained at a substantially uniform tension at least during the second wiping operation.

30. A method of preparaing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, and evaporating said solvent at a temperature approximately the same as the melting point of said wax.

31. A method of preparing moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, evaporating said solvent at a temperaure approximately the same as the melting point of said wax, and subjecting said coated regenerated cellulose to a humidifying treatment.

32. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, evaporating said solvent at a temperature approximately the same as the melting point of said wax, and deodorizing said coated regenerated cellulose.

33. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, and evaporating said solvent at a temperature approximately the same as the melting point of said wax, said regenerated cellulose being maintained at a substantially uniform tension at least during the second wiping operation.

34. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, evaporating said solvent at a temperature approximately the same as the melting point of said wax, and subjecting said coated regenerated cellulose to a humidifying treatment, said regenerated cellulose being maintained at a substantially uniform tension at least during the second wiping operation.

35. A method of preparing a moistureproof transparent material having a substantially uniform coated surface which comprises subjecting a sheet or film of regenerated cellulose having beads on its longitudinal edges to a humidifying atmosphere, applying thereto a moistureproofing composition including a volatile solvent and a wax, removing the excess of said composition first from the zones adjacent the beads and then from the entire width of said sheet or film, evaporating said solvent at a temperature approximately the same as the melting point of said wax, and deodorizing said coated regenerated cellulose, said regenerated cellulose being maintained at a substantially uniform tension at least during the second wiping operation.

36. A method of preparing a material having a substantially uniform coated surface which comprises applying a coating composition to a sheet or film having beads on its longitudinal edges, wiping the zones adjacent the beads of the said sheet or film to remove a portion of the excess of said composition and then wiping the entire surface of said sheet or film to remove the excess of said composition.

37. A method of preparing a material having a substantially uniform coated surface which comprises applying a coating composition to a sheet or film having beads on its longitudinal edges, wiping the zones adjacent the beads of said sheet or film to remove a portion of the excess of said composition, wiping the entire surface of said sheet or film to remove the excess of said composition and maintaining said sheet or film at a substantially uniform tension at least during the second wiping operation.

In testimony whereof, we have affixed our signatures to this specification.

WILLIAM H. CHARCH.
NORMAN A. CRAIGUE.